United States Patent [19]

Feinberg

[11] Patent Number: 4,881,772
[45] Date of Patent: Nov. 21, 1989

[54] REAR-WINDOW WIND DEFLECTOR FOR A VEHICLE

[76] Inventor: Lee N. Feinberg, 10763A Lady Palm La., Boca Raton, Fla. 33498

[21] Appl. No.: 255,980

[22] Filed: Oct. 11, 1988

[51] Int. Cl.⁴ .............................................. B62D 35/00
[52] U.S. Cl. ..................................... 296/180.1; 296/91
[58] Field of Search ............................... 296/91, 180.1

[56] References Cited

U.S. PATENT DOCUMENTS

| 3,529,862 | 9/1970 | Jousserandot | 296/180.1 |
| 4,174,863 | 11/1979 | Götz | 296/91 |
| 4,603,898 | 8/1986 | Udagawa | 296/91 |
| 4,726,618 | 2/1988 | Hansen | 296/91 |

FOREIGN PATENT DOCUMENTS 1215688 12/1970 United Kingdom .................. 296/91

Primary Examiner—Robert R. Song
Attorney, Agent, or Firm—John H. Faro

[57] ABSTRACT

A rear-window wind deflector comprising a channel plate having a leading edge, a trailing edge, and a plurality of substantially parallel channels therebetween. The cross-section of each channel decreases smoothly from the leading edge to the trailing edge. Means are provided for mounting the channel plate directly on the rear window of a vehicle with the trailing edge over the window and the leading edge cantilevered over the vehicle body forward of the window. In a preferred emobdiment, the channel plate and the channels therein are crescent-shaped.

7 Claims, 1 Drawing Sheet

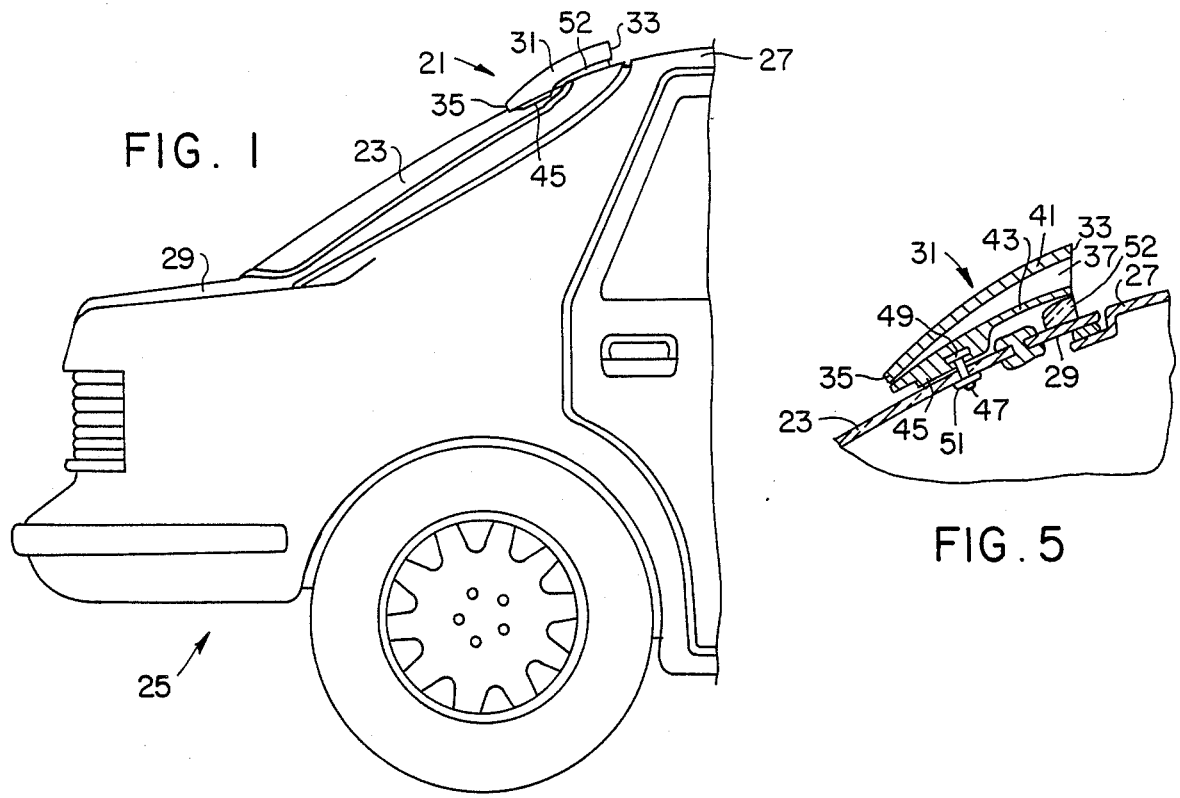
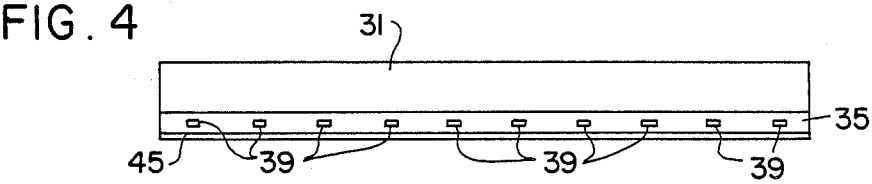
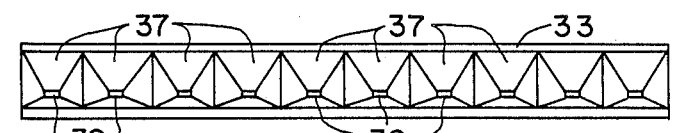
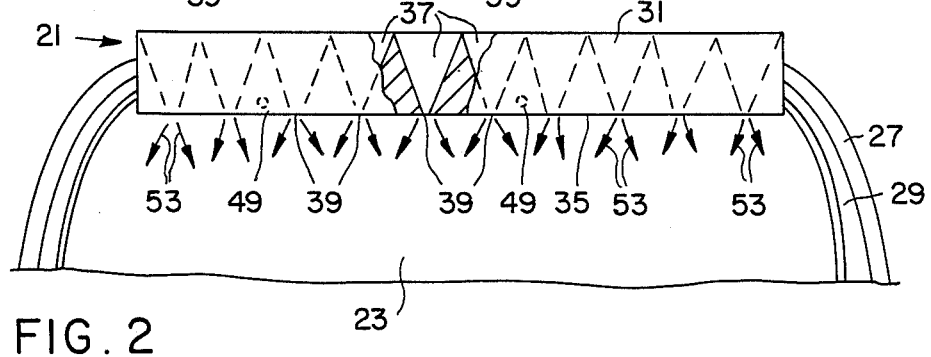

REAR-WINDOW WIND DEFLECTOR FOR A VEHICLE

BACKGROUND OF THE INVENTION

1. Field of the Invention

This invention relates to a novel wind deflector that is adapted to mount directly on the rear window of a vehicle. The novel wind deflector provides a passive means for continuously removing liquid, snow and/or particulate material from the external surface of the rear window of a vehicle having an aerodynamic shape.

2. Description of the Prior Art

Wind deflectors are used to deflect air against the rear windows of moving vehicles that are not aerodynamically-shaped. Vehicles that are not aerodynamically-shaped, such as station wagons, vans, and the like, generally have square back ends or, at least, rear windows that are mounted at high angles with respect to the horizontal. The wind deflectors help to reduce the effects of eddy currents behind the vehicle when it is moving forward, thereby reducing the accumulation of dirt on the rear window. These prior wind deflectors are baffles that provide only a single deflecting surface. These wind deflectors cause considerable drag when the vehicle is traveling at high speeds, as described, for example, in U.S. Pat. Nos. 4,155,585 to J. A. Bott; 4,170,381 to F. A. Helm; 4,293,159 to J. A. Bott; 4,339,145 to J. A. Bott et al.

Motor vehicles with aerodynamic shapes do not have this problem. The aerodynamic shapes of such vehicles streamline the vehicles to avoid eddy currents and other forms of turbulence. But, because of the low angles of the rear windows relative to horizontal, aerodynamically-shaped vehicles have the problem of slow drainage of rain water from the exterior surface of the rear window. The problem is aggravated, because the aerodynamic shape of the vehicle causes rain water on the roof of the vehicle to stream over the rear window as the vehicle moves forward, instead of being blown from the trailing roof edge. Rain water or snow on the outer window surface distorts and/or obscures the driver's visibility through the rear window.

In some cases, the aerodynamically-shaped vehicle is equipped with rear window wipers to remove accumulated rain water more rapidly from the outer surface of the window. Such wipers are expensive to install and require maintenance during their operating lives. Also, rear window wipers are intermittent, not continuous, and frequently do not keep up with large amounts of rain water streaming over the window.

OBJECTS OF THE INVENTION

An object of this invention is to provide a novel wind deflector for an aerodynamically-shaped vehicle.

A further object is to provide a novel wind deflector which continuously blows accumulated rain water and snow from the outer surface of the rear window of a moving vehicle.

A further object is to provide a novel wind deflector which attaches to the rear window of an aerodynamically-shaped vehicle.

Still another object is to provide a novel deflector which obviates the need for a rear window wiper on an aerodynamically-shaped vehicle.

SUMMARY OF THE INVENTION

The novel wind deflector comprises a channel plate having a leading edge, a trailing edge and a plurality of substantially parallel channels therethrough between the leading edge and the trailing edge. Each channel has a cross-section that decreases smoothly from the leading edge to the trailing edge. The novel wind deflector includes means, integral with the channel plate, for mounting the channel plate directly on the rear window of a vehicle, with the trailing edge over the window and the leading edge cantilevered over a portion of the vehicle body that is forward of the rear window. The mounting may include two or more bolts, with the bolt heads, embedded in the cahnnel plate and the threaded portions extending out of the lower wall of the channel plate. In a preferred embodiment, the channel plate and the channels therethrough are crescent-shaped to provide for a gradual change of direction between the leading edge and the trailing edge, and for an aesthetically-attractive overall appearance for the deflector. In use, the bolts pass through holes in the rear window and are held in place with nuts thereon.

The novel wind deflector is mounted on the exterior surface of the window, as described, and, with the vehicle moving forward, wind is driven into the channels at the leading edge of the channel plate. Because of the smooth reduction in cross-section of the channels, the velocity of the captured wind is converted to air pressure in the channels, reaching a maximum pressure in the channels at about the trailing edge of the channel plate. The compressed air leaves the channels and expands into a plurality of high velocity air jets which are directed downward over the outer surface of the rear window. The high-velocity jets of air from the channel plate rapidly and continuously blow rain water, snow and solid particles off the rear window, thereby keeping the window clear. Since there are no moving parts, the novel deflector has a minimum initial cost and a minimum in subsequent maintenance. The need for a rear window wiper is obviated. The novel wind deflector can be designed so that it does not obstruct the vision of the driver out of the rear window and may shade the rear window from sunlight.

BRIEF DESCRIPTION OF THE DRAWINGS

FIG. 1 is a fragmentary side view of the rear portion of a motor vehicle having a novel wind deflector installed thereon.

FIG. 2 is a fragmentary rear view of the vehicle shown in FIG. 1 showing the novel wind deflector, which is partially broken away, installed thereon.

FIG. 3 is an elevational view of the leading edge of the novel wind deflector, shown in FIGS. 1 and 2.

FIG. 4 is an elevational view of the trailing edge of the novel wind deflector, shown in FIGS. 1 and 2.

FIG. 5 is fragmentary sectional view of the novel wind deflector, shown in FIGS. 1 and 2, showing the mounting means in more detail.

DETAILED DESCRIPTION OF THE INVENTION INCLUDING THE PREFERRED EMBODIMENTS

The following description of some of the preferred embodiments of the concepts of this invention is made in reference to the accompanying figures. Where an individual structural element is depicted in more than one figure, it is assigned a common reference numeral for simplication of identification and understanding.

FIGS. 1, 2 and 5 show a preferred embodiment of the novel wind deflector (21) mounted on the rear window (23) of a motor vehicle (25). The vehicle (25) comprises a vehicle body (27) which includes a hatch-back door (29) in which the rear window (23) is mounted. The vehicle (25) has an aerodynamic design so as to reduce wind resistance and to reduce turbulence when the vehicle (25) is traveling in the forward direction, particularly at speeds above thirty-five miles per hour (35 mph). To achieve this design, the rear window (23) is mounted at a low angle of about thirty degrees (30°) with respect to the horizontal. The novel wind deflector can be used on rear windows with still lower angles, and also can be used to advantage on rear windows at higher angles up to about forty degrees (40°).

The preferred wind deflector (21) includes a channel plate (31) having a leading edge (33) facing forward on the vehicle (25) and a trailing edge (35) facing rearward and down toward the rear window (23). The channel plate (31) has a width (side-to-side dimension) somewhat less than the width of the rear window (23), and a length between the leading edge (33) and the trailing edge (35) of about nine inches (9 in.), although the length could be less or greater than nine inches (9 in.).

The channel plate (31) has a plurality (ten (10) in this embodiment) of substantially parallel (37) therethrough between the leading edge (33) and the trailing edge (35). The cross-section of each channel (33) decreases slowly from about four inches (4 in.) wide and one inch (1 in.) high at the leading edge (33) where it is the greatest, to being the least at the trailing edge (35), where there is a relatively small rectangular rear opening (39) about one inch (1 in.) wide and about one-half (½ in.) high, as shown in FIGS. 3 and 4. The channels (37) may have other sizes and profiles in the same deflector and/or in different embodiments of the novel deflector. There may be any number of channels present.

The preferred channel plate (31) includes an upper wall (41) and a lower wall (43), and a means for mounting the channel plate (31) on the outer surface of the rear window (23). The channel plate (31) has a generally crescent-shape with the lower wall (43) defining the inside of the crescent. The channels (37) also have a crescent-shape as shown in FIGS. 3 and 5. The channel-plate mounting means includes a pedestal (45) integral with the lower wall (43) and generally is shaped to conform with the outer shape of the rear window (23). The channel-plate mounting means includes, also, two (2) mounting bolts (47) with the heads (49) thereof inside the channel plate (33), each bolt head (49) being in a transverse wall between two (2) adjacent channels (37). The other threaded end of each bolt (47) extends out of the bottom wall (43) and pedestal (45) as shown in FIG. 5. The threaded end of each bolt (47) extends through a hole in the rear window (23) with a nut (51) threaded thereon holding the channel plate (31) in place with the outer surface of the pedestal against the outer surface of the rear window (23), as shown in FIG. 5. There is a gasket between the window (23) and each of the nuts (51). A spacer (52) is pressed between the cantilevered end of the leading edge (33) and the door (29) to prevent air from flowing under the channel plate (31).

All of the parts of the novel wind deflector may be made of plastic, either as a single piece or as an assembly of several pieces. In the preferred embodiment described above, each bolt (47) is made of metal with the bolt head (49) cast into a single piece of molded plastic. The finished molded plastic should be hard, weather-resistant, and paintable. Polyurethane is the preferred plastic material.

With the novel wind deflector (21) mounted on the rear window (23) as shown in FIGS. 1, 2 and 5, the trailing edge (35) is over and closely spaced from the outer surface of the rear window (23), and the leading edge (33) is cantilevered over a portion of the vehicle body that is forward of the rear window. The top of the leading edge (33) is above the roof of the vehicle. When the vehicle (25) is traveling in the forward direction, air is captured and driven into the channels (37) at the leading edge (33) of the channel plate (31).

Because the channels (37) are tapered from the leading edge (33) to the trailing edge (35), the relative velocity between the channel plate (31) and the captured air is converted to air pressure, reaching its maximum pressure at or near the rear openings (39). The compressed air then expands as it exits through the rear openings (39) as a plurality of high-velocity air jets, which are indicated by the arrows (53). The air jets are directed at the exterior surface of the rear window (23). The air jets have a sufficiently high velocity to be capable of continuously driving rain water, snow and particulate material from the window surface rapidly. Because of the spacing of the openings (39), the spread of the air jets covers substantially all of the window area which is necessary for providing adequate visibility and vision to the driver through the rear window (23). In fair weather, the air jets operate continuously to drive particulate matter away from the window. In addition, the novel deflector provides a substantial amount of shading from sunlight on the rear window.

The foregoing figures and descriptions thereof are provided as illustrative of some of the preferred embodiments of the concepts of this invention. While these embodiments represent what is regarded as the best mode for practicing this invention, they are not intended as delineating the scope of the invention, which is set forth in the following claims.

What is claimed is:

1. A wind deflector for use with a vehicle, said vehicle comprising a vehicle body having a rear window mounted in said body at low angles relative to horizontal, said wind deflector comprising a channel plate having a leading edge, a trailing edge, and a plurality of substantially parallel channels therethrough between said leading edge and said trailing edge, each channel having a cross-section that decreases smoothly from said leading edge to said trailing edge, said wind deflector including means integral with said channel plate for mounting said channel plate directly on said rear window with said trailing edge over said window and said leading edge cantilevered over a portion of said vehicle body forward of said window.

2. The deflector defined in claim 1 wherein said leading edge faces substantially in the direction of forward travel of said vehicle, and said channels at said trailing edge are adapted to direct air passing through said channels against said window.

3. The deflector defined in claim 1 wherein said channel plate includes a solid upper wall spaced from a solid lower wall by said plurality of channels, each of said walls extending between said leading edge and said trailing edge, said body having a generally crescent-shape with said lower wall defining the inside of said crescent-shape.

4. The deflector defined in claim 3 wherein said mounting means includes at least two (2) bolts embedded in said channel plate and extending out of said lower wall.

5. The deflector defined in claim 4 including a pedestal integral with said lower wall and around each of said bolts.

6. In combination, the deflector defined in claim 4 and said vehicle, said rear window of said vehicle having a hole therethrough for each of said bolts, said bolts extending through said holes and including a nut on each of said bolts holding said deflector securely in place against said rear window.

7. The combination defined in claim 6 wherein said rear window is mounted with respect to horizontal at angles up to and not greater than forty degrees (40°).

* * * * *